(12) United States Patent  (10) Patent No.: US 6,474,457 B2
Saiko  (45) Date of Patent: Nov. 5, 2002

(54) BI-DIRECTIONAL CLUTCH

(75) Inventor: Masaaki Saiko, Nagoya (JP)

(73) Assignee: Aichi Kikai Kogyo Kabushiki Kaisha, Nagoya (JP)

( * ) Notice: Subject to any disclaimer, the term of this patent is extended or adjusted under 35 U.S.C. 154(b) by 33 days.

(21) Appl. No.: 09/770,301

(22) Filed: Jan. 29, 2001

(65) Prior Publication Data

US 2002/0046914 A1 Apr. 25, 2002

(30) Foreign Application Priority Data

Oct. 19, 2000 (JP) ........................... 2000-320093

(51) Int. Cl.⁷ ................................... F16D 41/08
(52) U.S. Cl. ......................... 192/38; 192/56.1
(58) Field of Search ................. 192/38, 45, 56.1, 192/35; 464/34, 30

(56) References Cited

U.S. PATENT DOCUMENTS 3,476,226 A * 11/1969 Massey ................... 192/38
5,672,110 A * 9/1997 Kurita et al. ............ 192/45

FOREIGN PATENT DOCUMENTS

JP 1-229122 A * 9/1989
JP 9-222136 A * 8/1997
JP 9-222137 A * 8/1997

* cited by examiner

Primary Examiner—Rodney H Bonck
(74) Attorney, Agent, or Firm—Dennison, Schultz & Dougherty

(57) ABSTRACT

A bi-directional clutch comprises an outer ring, an inner ring and a roller. The roller is retained by a retainer and is positioned between the outer ring and the inner ring. The outer ring has a cam surface, so that the roller forms a wedge that contacts the outer ring and the inner ring.

5 Claims, 6 Drawing Sheets

BI-DIRECTIONAL CLUTCH

BACKGROUND OF THE INVENTION

1. Field of the Invention

The present invention relates to a bi-directional clutch.

2. Description of the Related Art

A conventional bi-directional clutch has a structure as shown in FIG. 7, which shows a sectional view of the essential portion of the clutch. A bi-directional clutch 51 is constituted so that a gourd-shaped sprag 55 is disposed within a retainer 54 between an outer ring 52 and an inner ring 53 and is biased by a spring plate 56. When the outer ring 52 rotates in a normal direction indicated by an arrow a in FIG. 7, the retainer 54 rotates in a reverse direction relative to the outer ring, so that the sprag 55 is tilted toward the rotational direction of the outer ring 52. Therefore, an upper surface and a lower surface of the sprag 55 contact with the outer ring 52 and the inner ring 53, respectively, so as to form a wedge. As a result, the inner ring 53 rotates idle in a direction indicated by an arrow b, which is the same direction as the rotational direction of the outer ring 52.

On the other hand, the clutch is constituted so that the sprag 55 is tilted to the reverse direction, when the outer ring 52 is rotated in the reverse direction as shown in FIG. 8. As a result, the inner ring 53 rotates idle in the same direction as that of the outer ring 52, or the direction indicated by the arrow b. It should be noted that the inner ring 53 may be locked in rotational directions indicated by arrows c in FIG. 7 and FIG. 8.

In the conventional bi-directional clutch 51 employing the sprag 55, when the sprag 55 is abruptly tilted by the application of an excessive torque, the height of the sprag 55 may be abruptly reduced, so that a roll-over (an excessive tilting) phenomenon occurs. As a result, when an excessive torque is loaded, a problem may be caused that the rotational force of the outer ring 52 cannot be properly transmitted to the inner ring 53, or that the transmission of rotation between the outer ring 52 and the inner ring 53 cannot be properly interrupted.

SUMMARY OF THE INVENTION

The present invention has been contemplated in consideration of the above problems.

It is an object of the present invention to provide a bi-directional clutch, which does not cause a roll-over phenomenon.

According to the present invention, a bi-directional clutch comprises an outer ring, an inner ring and a roller. The roller is retained by a retainer and is positioned between the outer ring and the inner ring. The outer ring has a cam surface, so that the roller forms a wedge that contacts the outer ring and the inner ring. Therefore, the inner ring can be rotated in the same direction as the outer ring. The roller does not cause a roll-over phenomenon that may be caused by the conventional clutch incorporating sprags. Therefore, the rotational force of the outer ring can be properly transmitted to the inner ring, or the transmission of power between the outer ring and the inner ring can be properly interrupted.

Preferably, the cam surface includes a first cam surface for a normal rotation and a second surface for a reverse rotation. Therefore, when the outer ring rotates in either the normal direction or the reverse direction, the roller can form a wedge so as to rotate the inner ring in the same direction as the outer ring.

Preferably, the bi-directional clutch further includes a stopper surface at one end of the cam surface. The roller contacts the stopper surface when a load torque exceeds a set load torque, so that the stopper surface functions as a torque limiter. Therefore, when a large load is applied, the roller contacts the stopper surface, so that a strut angle increases to cause a slip. As a result, an excessive load can be favorably prevented.

BRIEF DESCRIPTION OF THE DRAWINGS

The present invention will be described below with reference to the appended drawings, wherein.

DESCRIPTION OF A PREFERRED EMBODIMENT

An embodiment of the present invention will be described below with reference to the appended drawings.

Figure 1:
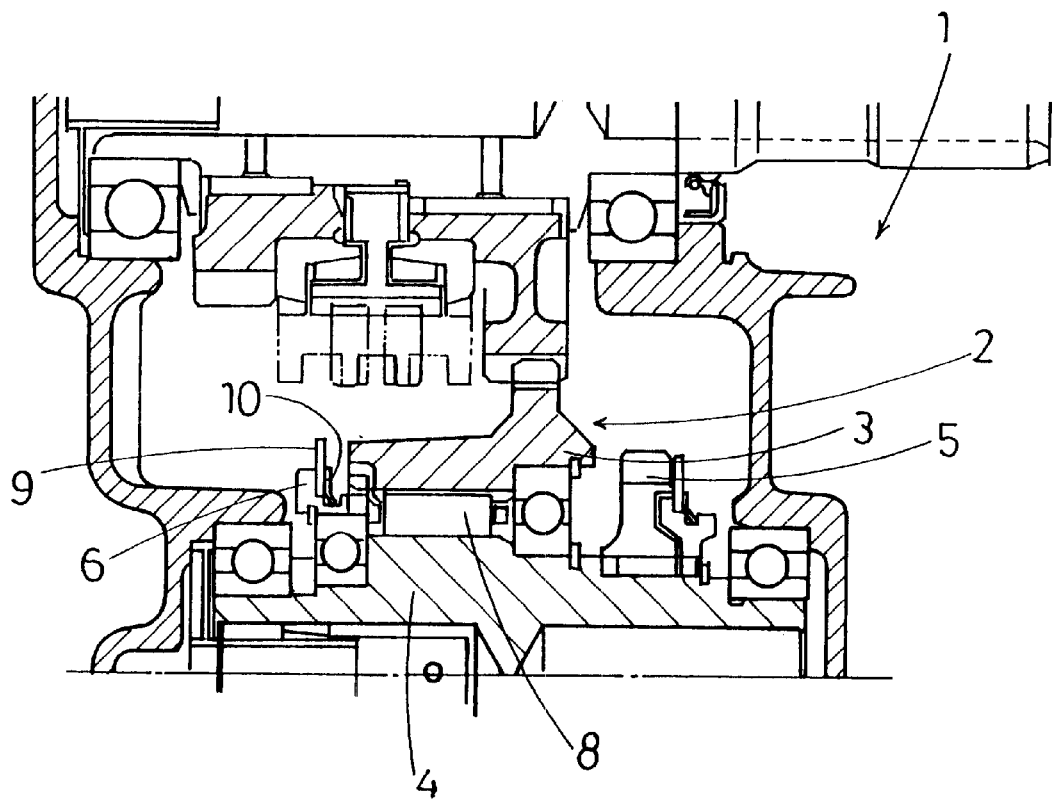
FIG. 1 is a sectional view of a sub-power transmission path of a continuously variable transmission incorporating a bi-directional clutch according to a preferred embodiment of the present invention.
Figure 2:
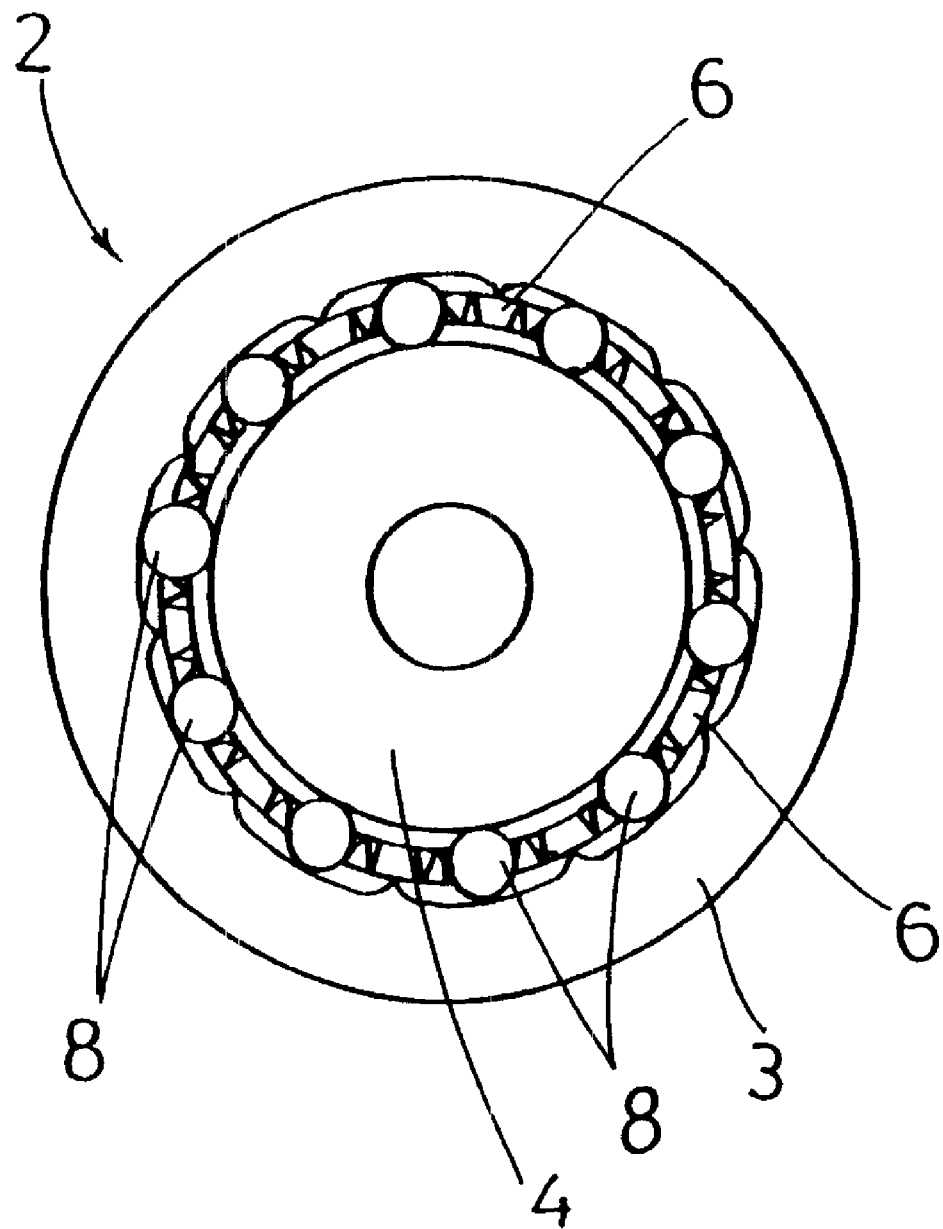
FIG. 2 is an enlarged section view of the bi-directional clutch.

In this embodiment, a bi-directional clutch 2 is provided within a sub-power transmission path 1 of a continuously variable transmission shown in FIG. 1. The bi-directional clutch 2 has a structure as shown in a sectional view in FIG. 2 and comprises an outer ring 3 with an input gear, an inner ring 4 with an output gear, and a plurality of rollers 8 which are retained by a retainer 6 and are positioned between the outer ring 3 and the inner ring 4. A friction plate 9 is disposed on the outer side and is biased by a spring 10 so as to be pressed against the retainer 6.

Figure 3:
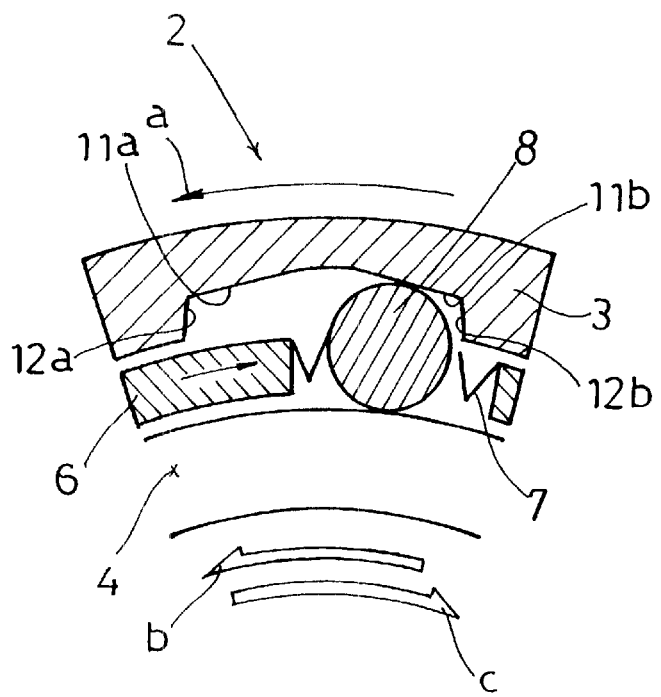
FIG. 3 is an illustrative sectional view of the bi-directional clutch and showing the operation when an outer ring rotates in a normal direction.

FIG. 3 shows a sectional view of the essential portion of the bi-directional clutch when the outer ring 3 rotates in a normal direction. As shown in FIG. 3, when the outer ring 3 is rotated in a direction indicated by an arrow a by the rotational force transmitted from an engine (not shown), the retainer 6 rotates relative to the outer ring 3 in the opposite direction, because the rotation of the retainer 6 is prevented by the friction plate 9. Therefore, each of the rollers 8, which rollers are retained within the retainer 6 by spring plates 7, contacts a right side cam surface 11b that is formed by a part of a recess formed in an inner peripheral surface of the outer ring 3 as shown in FIG. 3.

The right side cam surface 11b is inclined, so that it is symmetrical with a left side inclined cam surface 11a of the recess. Thus, the left and right side cam surfaces 11a and 11b together form an inverted V-shaped cam surface. The roller 8 that contacts the right side cam surface 11b may be moved downward so as to contact the outer peripheral surface of the inner ring 4. As a result, the roller 8 forms a wedge between the outer ring 3 and the inner ring 4, so that the inner ring 4 rotates idle in a direction indicated by an arrow b in the same direction as the rotational direction a of the outer ring 3. It should be note d that the inner ring 4 is locked in a direction indicated by an arrow C.

A part of the recess at the left side end of the left side cam surface 11a forms a stopper surface 12a with a large inclined angle. Similarly, a part of the recess at the right side end of the right side cam surface 11a forms a stopper surface 12b with a large inclined angle.

Figure 4:
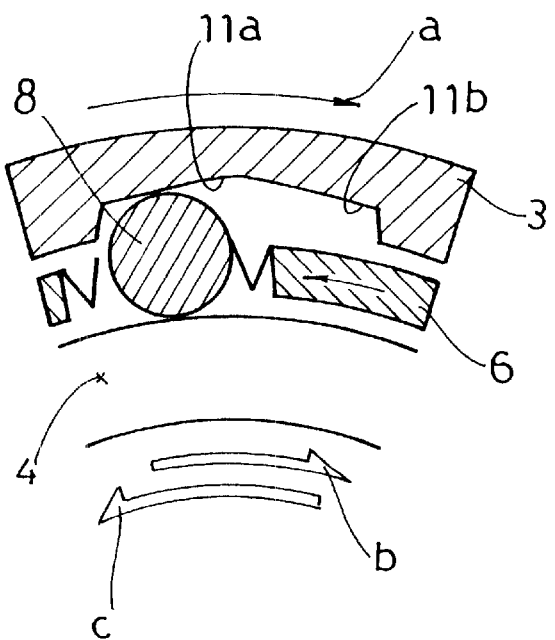
FIG. 4 is an illustrative sectional view of the bi-directional clutch and showing the operation when the outer ring rotates in a reverse direction.

When the outer ring 3 rotates in a reverse direction as shown in FIG. 4, the retainer 6 rotates relative to the outer ring 3 in the opposite direction. Then, the roller 8 contacts the left side cam surface 11a so as to form a wedge between the outer ring 3 and the inner ring 4. Therefore, the inner ring 4 can rotate idle together with the outer ring 3 in the direction b or the reverse direction. Thus, the rotation of the outer ring 3 can be properly transmitted to the inner ring 4 even when the outer ring 3 rotates in the reverse direction.

Preferably, the rollers 8 have a cylindrical configuration, so that a roll-over phenomenon may not occur as is caused when the conventional sprags are incorporated. More specifically, the height of the roller may not be reduced by an excessive tilting phenomenon as in the case of the sprags.

Thus, a roll-over phenomenon does not occur. Therefore, when the outer ring 3 rotates in either the normal direction or the reverse direction, the power can be properly transmitted to the inner ring 4 or the transmission of power between the outer ring 3 and the inner ring 4 can be properly interrupted.

Figure 5:
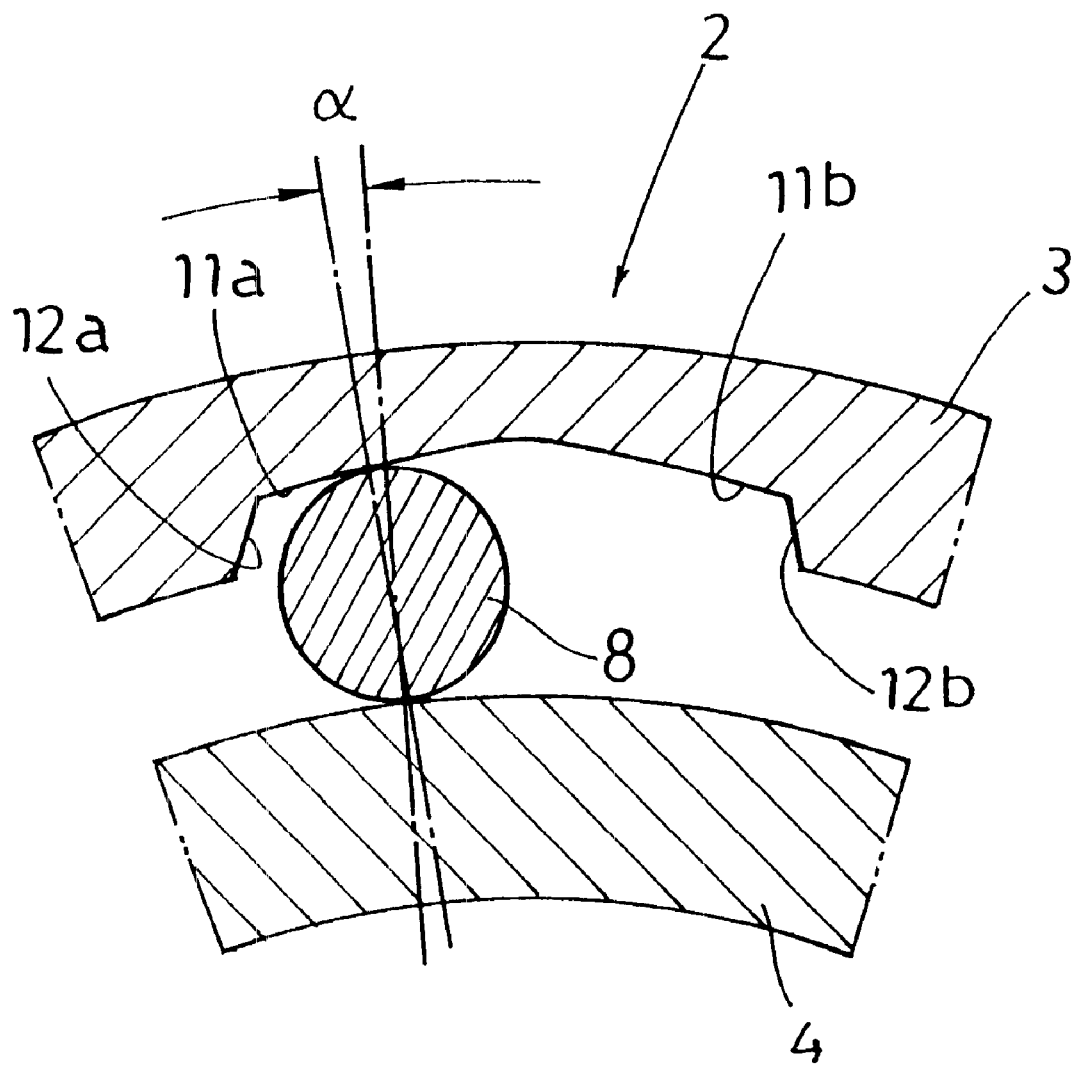
FIG. 5 is a schematic sectional view of a roller and showing an engaging state of the roller when a small load is applied to the bi-directional clutch.

As shown in a schematic view of FIG. 5, when the outer ring 3 rotates in the reverse direction with a small load torque, a strut angle $\alpha$ is small. In this state, the power of the outer ring 3 can be properly transmitted to the inner ring 4, so that the inner ring 4 rotates in the same direction as the outer ring 3.

Figure 6:
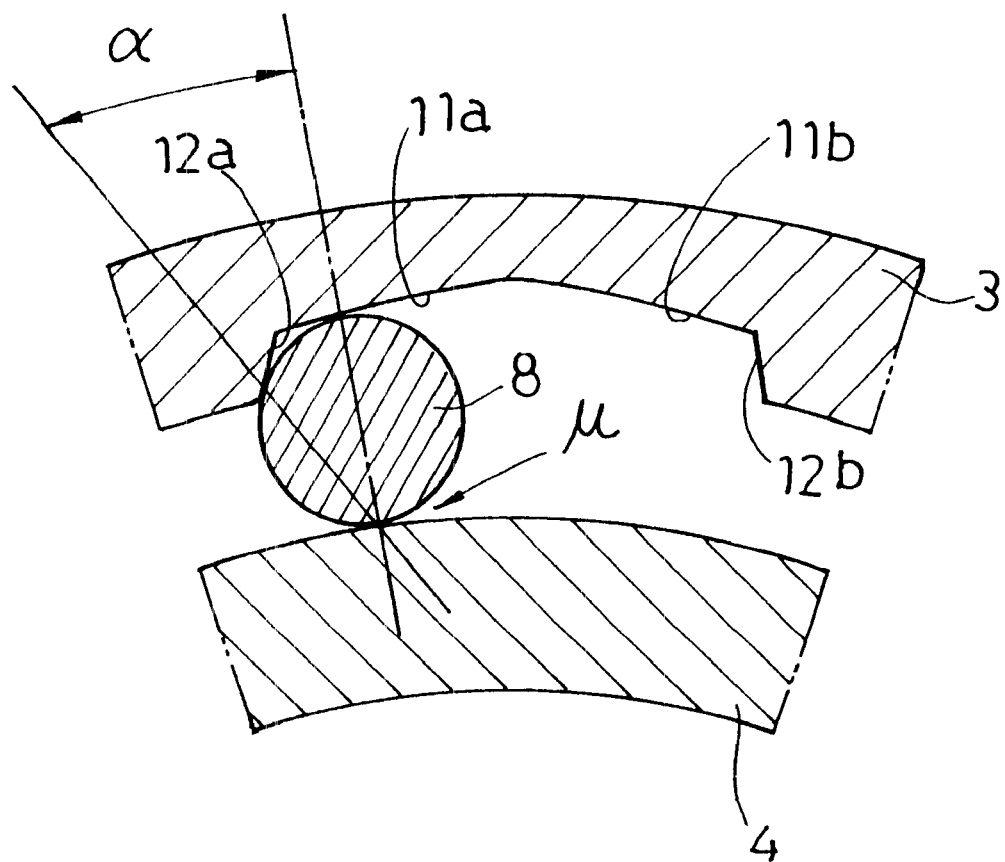
FIG. 6 is a schematic sectional view of the roller and showing a contacting state of the roller with a stopper surface when a large load is applied.
Figure 7:
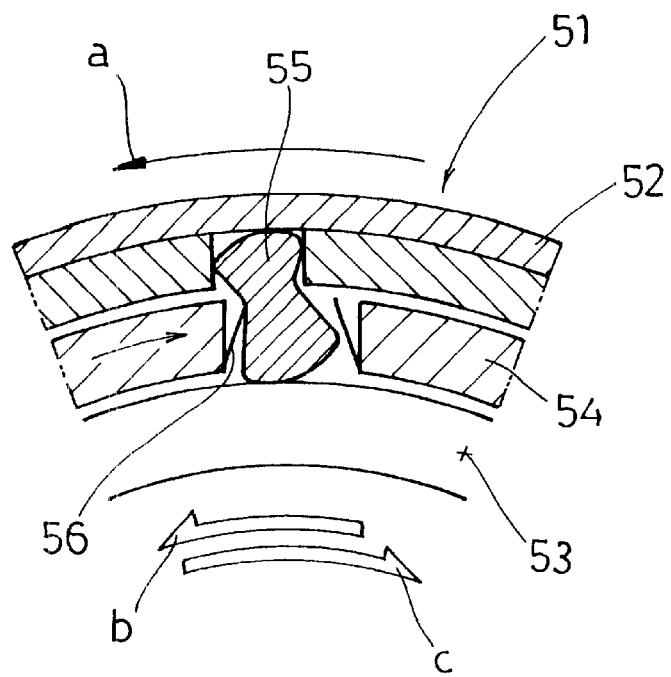
FIG. 7 is an illustrative sectional view of a conventional bi-directional clutch having sprags and showing the state when rotating in a normal direction.
Figure 8:
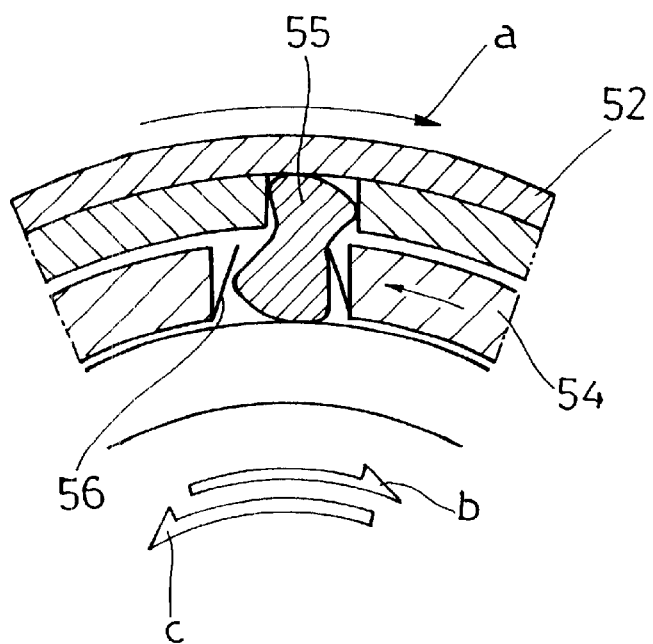
FIG. 8 is an illustrative sectional view of the conventional bi-directional clutch and showing the state when rotating in the reverse direction.

When the outer ring 3 rotates with a large load torque, the roller 8 contacts the stopper surface 12a, so that the strut angle $\alpha$ increases as shown in FIG. 6. This may produce the inequality of $\tan \alpha > \mu$ ($\mu$: friction factor) that may result in a slip. Therefore, the transmission of an excessive load can be favorably prevented. That is to say, the stopper surface 12a can operate as a torque limiter to prevent an excessive load.

Similarly, when the outer ring 3 rotates in the normal direction with a large load torque, the roller 8 contacts the stopper surface 12b, so that a torque limiting function can be exerted.

Although the above preferred embodiment has been described in connection with a bi-directional clutch provided within a sub-power transmission path of a continuously variable transmission, the bi-directional clutch of this embodiment is also applicable to the other machines and devices which require transmission and interception of power to both of normal and reverse rotational directions.

The invention is not limited to the embodiment depicted and described. Rather, the scope of the invention is defined by the appended claim.

What is claimed is:

1. A bi-directional clutch comprising an outer ring, an inner ring, and a roller, a retainer having spring plates, said roller being retained by said spring plates and positioned between said outer ring and said inner ring, and said outer ring having a cam surface, wherein said cam surface includes a first surface for a normal rotation and a second surface for a reverse rotation, so that said roller forms a wedge that contacts said outer ring and said inner ring, a stopper surface at one end of said cam surface, said roller contacting said stopper surface when a load torque exceeds a set load torque, so that said stopper surface functions as a torque limiter.

2. A bi-directional clutch of claim 1, wherein said cam surface includes a first cam surface for a normal rotation and a second surface for a reverse rotation.

3. A bi-directional clutch of claim 1, further including a stopper surface at one end of said cam surface, said roller contacting said stopper surface when a load torque exceeds a set load torque, so that said stopper surface functions as a torque limiter.

4. A bi-directional clutch comprising an outer ring, wherein said outer ring is formed with an input gear, an inner ring, wherein said inner ring is formed with an output gear, and a plurality of rollers, said plurality of rollers being retained by a retainer and positioned between said outer ring and said inner ring, and said outer ring having a cam surface, wherein said cam surface includes a first surface for a normal rotation and a second surface for a reverse rotation, so that said roller forms a wedge that contacts said outer ring and said inner ring, a stopper surface at one end of said cam surface, said roller contacting said stopper surface when a load torque exceeds a set load torque, so that said stopper surface functions as a torque limiter, and a friction plate pressed against said retainer by a spring.

5. A bi-directional clutch according to claim 4, wherein each of said rollers is retained within said retainer by means of spring plates.

* * * * *